United States Patent [19]

D'Orazio et al.

[11] Patent Number: 5,015,396
[45] Date of Patent: May 14, 1991

[54] REMOVAL OF CYANIDE FROM AQUEOUS STREAMS

[75] Inventors: Robert P. D'Orazio, Houston, Tex.; John F. Rakszawski, Basking Ridge, N.J.

[73] Assignee: The BOC Group, Inc., Murray Hill, N.J.

[21] Appl. No.: 580,734

[22] Filed: Sep. 11, 1990

[51] Int. Cl.$^5$ .............................. C02F 1/72; C02F 1/58
[52] U.S. Cl. ...................................... 210/763; 210/904; 204/DIG. 13; 75/737
[58] Field of Search ............... 210/763, 904, 758, 762, 210/761, 743; 204/DIG. 13; 75/737

[56] References Cited

U.S. PATENT DOCUMENTS

| | | | |
|---|---|---|---|
| 3,586,623 | 6/1971 | Kuhn | 210/763 |
| 3,617,567 | 11/1971 | Mathre | 210/904 |
| 4,537,686 | 9/1985 | Borbely et al. | 210/713 |
| 4,615,873 | 10/1986 | Devuyst et al. | 210/904 |
| 4,622,149 | 11/1986 | Devuyst et al. | 210/717 |
| 4,840,735 | 6/1989 | Goodwin | 210/904 |

FOREIGN PATENT DOCUMENTS

| | | | |
|---|---|---|---|
| 153792 | 9/1982 | Japan | 210/763 |
| 859320 | 8/1981 | U.S.S.R. | 210/763 |

OTHER PUBLICATIONS

D. Muir, "Recent Advances in Gold Metallurgy", The AusIMM Adelaide Branch, Research and Development in Extractive Metallurgy, May 1987.

S. G. Nutt and S. A. Zaidi, "Treatment of Cyanide-Containing Waste-waters by the Copper-Catalyzed $SO_2$/Air Oxidation Process", Proc. Chem. Waste Conf. 1984, vol. 38.

S. A. K. Palmer, M. A. Breton, T. J. Nunno, D. M. Sullivan and N. F. Surprenant, "Metal/Cyanide-Containing Wastes", Pollution Technology Review No. 158.

M. D. Gurol and T. E. Holden, "The Effect of Copper and Iron Complexation on Removal of Cyanide by Ozone", Ind. Eng. Chem. Res. 1988, vol. 27, No. 7, 1988, pp. 1157-1162.

The McCoy Scoop, Edition 11, May 1990.

Primary Examiner—Stanley Silverman
Assistant Examiner—Neil M. McCarthy
Attorney, Agent, or Firm—Robert I. Pearlman; Coleman R. Reap

[57] ABSTRACT

Cyanide present in aqueous streams, such as effluents from electroplating and gold mining operations is reduced or elliminated by contacting the cyanide-containing stream with oxygen and carbon dioxide in the presence of cupric ions. The oxygen may be provided by air or oxygen and the contacting is carried out at until the pH of the aqueous stream is reduced to a value in the range of about 6 to 8 and preferably 6.5 to 7.5. Cupric sulfate has been found to be particularly effective for the described reaction.

20 Claims, No Drawings

REMOVAL OF CYANIDE FROM AQUEOUS STREAMS

BACKGROUND OF THE INVENTION

1. Field Of The Invention

This invention relates to the removal of cyanide ions from aqueous streams, and more particularly to the removal of cyanide ions from industrial process waste water streams.

Cyanides are used in a variety of industrial processes that are carried out in aqueous media, such as the recovery of gold from ore and electroplating. Many gold mining operations use cyanide solutions to leach gold from the ore. After removal of the gold most of the leaching solution is recycled. However, a portion of the leaching solution is discharged as waste water to avoid accumulation of other metals. In metal plating, discharges of cyanide result from the rinsing of finished products from cyanide-type plating operations. This step likewise results in the discharge of considerable amounts of cyanide into waste water streams. Because of its extremely toxic nature cyanide in waste water streams must be destroyed before disposal of the stream.

2. Prior Art

Various techniques have been employed to destroy residual cyanides in waste water streams or to convert them to less toxic compounds. One technique commonly used is to convert the cyanides to less toxic cyanide complexes such as ferrocyanides and ferricyanides by the reaction of iron salts with the free cyanides. The resulting cyanide complexes are generally precipitated and removed from the aqueous stream as sludge. Unfortunately, this method of cyanide treatment results in the formation of considerable quantities of sludge. Furthermore, if the sludge is exposed to the environment the ferrocyanides and ferricyanides may be decomposed to free cyanides by the action of sunlight.

Another procedure for eliminating cyanides from aqueous streams involves the conversion of the cyanides to relatively harmless cyanates, which eventually break down and are released to the atmosphere as carbon dioxide and ammonia. Hydrogen peroxide, carbon dioxide and dilution water have been used in some western United States gold mining operations to reduce the amount of cyanide in tailings. The cyanide is apparently converted to cyanate. D. Muir, in an article entitled "Recent Advances In Gold Metallurgy", published by the AusIMM Adelaide Branch and Development in Extractive Metallurgy in May, 1987, discloses the oxidation of cyanide to cyanate and eventually to carbonate and ammonia by contacting the cyanide with oxygen and carbon catalyst in the presence of $Cu^{++}$ ions. Another method for converting cyanide in waste water streams to cyanate is disclosed in U.S. Pat. No. 4,537,686. The procedure described in this patent comprises contacting the cyanide with sulfur dioxide and oxygen in the presence of a copper catalyst, such as $CuSO_4$. This process is effective, however it is costly and involves the use of sulfur dioxide, which itself is toxic and difficult to handle. Another possible disadvantage of this process is the fouling of process equipment as a result of the formation of insoluble compounds, such as calcium sulfate, when alkaline earth metal ions are present in the slurry.

The growing use of cyanide in industrial water-based processes has resulted in the development of large volume cyanide-containing industrial waste water effluent streams and the creation of many cyanide-containing industrial waste ponds. These effluents and ponds present a constant hazard because of the danger of pollution of fresh water supplies from spills. Consequently, there is an ongoing need for an effective, safe and inexpensive method for removing cyanides from aqueous streams. The method of the present invention fulfills that need.

OBJECTS OF THE INVENTION

It is an object of the invention to provide a novel process for destroying cyanide in aqueous systems.

It is another object of the invention to provide an inexpensive and safe method of removing cyanide from waste water streams.

It is another object of the invention to present a method of destroying cyanides in aqueous streams without the undesired formation of insoluble compounds that foul process equipment.

These and other objects and advantages of the invention will become apparent upon review of the following description and examples.

SUMMARY OF THE INVENTION

According to the invention, cyanide ions that are present in an aqueous stream, such as a body of water or an effluent from an industrial process, are destroyed by contacting the cyanide-containing aqueous stream with oxygen and carbon dioxide in the presence of a water-soluble oxidizing catalyst. Generally, the oxygen is present in an amount sufficient to produce the desired degree of cyanide conversion, the carbon dioxide is added in an amount sufficient to reduce the pH to the desired value, the reaction is carried out until the pH of the aqueous stream is in the range of about 6 to B. and the water-soluble catalyst is a cupric or ferric salt. The oxygen to cyanide molar ratio is usually maintained in the range of about 0.5 to about 20:1.

In preferred embodiments, the oxygen to cyanide molar ratio is maintained in the range of about 1 to about 10:1, the reaction is carried out until the pH of the aqueous medium is in the range of about 6.5 to about 7.5. and the water-soluble catalyst is Cu $SO_4$.

DETAILED DESCRIPTION OF THE INVENTION

The invention may be practiced on a batch, semi-batch, or continuous basis and it may be applied to the treatment of a standing body of water or moving water. The term "aqueous stream", as used in this description, applies to either standing bodies of water or moving streams of water.

The method of introducing the oxygen and carbon dioxide into the aqueous stream being treated is not critical. The gases may be added separately or as a gaseous mixture, and, although it is usually desirable to inject them into the aqueous stream on a continuous basis, they may be intermittently introduced into the stream. The oxygen may be introduced into the contact zone either as pure oxygen or as part of a gaseous mixture, such as air. In some cases it is preferred to use oxygen rather than air because of the increased efficiency attained when using oxygen, however in other cases air is preferred because of its lower cost.

The amounts of oxygen and carbon dioxide maintained in the contact zone during the reaction period is not critical. The lower limits of these reagents will be determined by the degree of cyanide removal that is desired in the aqueous stream being treated, and the upper limits are limited by economics. Aside from these considerations, the amounts of oxygen and carbon introduced into the aqueous stream being treated generally depends upon the amount of cyanide present in the stream. As noted above, sufficient oxygen is usually added to provide an oxygen to cyanide molar ratio in the range of about 0.5 to about 20:1, i.e. about 0.5 to about 20 moles of oxygen are added for each mole of cyanide present in the contact zone of the aqueous stream. In preferred embodiments, the molar ratio of oxygen to cyanide in the contact zone is generally maintained in the range of about 1 to about 10:1. As also indicated above, the amount of carbon dioxide introduced into the aqueous stream is usually sufficient to reduce the pH of the aqueous medium being treated to a value in the range of about 6 to about 8:1, and preferably, sufficient carbon dioxide is added to reduce the pH of the aqueous medium to a value in the range of about 6.5 to about 7.5:1.

The water-soluble catalyst is generally in the form of a water-soluble compound, such as a water-soluble salt. Water-soluble salts, such as water-soluble cupric and ferric salts are preferred. The preferred salt is cupric sulfate. As is the case with the oxygen and the carbon dioxide, the concentration of catalyst maintained in the reaction zone during the reaction period is not critical and the amount used is influenced by the concentration of cyanide present in the aqueous stream being treated and the degree of cyanide removal sought. In general, sufficient catalyst is added to destroy substantially all of the cyanide present in the aqueous stream being treated. In the case of cupric salt, it is usually desirable to add sufficient catalyst to provide a metal ion to cyanide ion mole ratio of at least about 0.1:1.

The aqueous solutions being treated usually have a high pH, for example above about 10. During the course of the reaction of the invention the pH of the solution being treated is reduced by additions of carbon dioxide to a value in the range of about 6 to 8, and in preferred embodiments sufficient carbon dioxide is added to lower the pH of the aqueous medium to a value in the range of about 6.5 to about 7.5.

The temperature and pressure in the contact zone are not critical, although the reaction kinetics is influenced by the temperature and pressure of the aqueous stream being treated. The temperature of the aqueous stream entering the reaction zone is generally in the range of about 10 to about 90 degrees C. Most commonly, the temperature of the aqueous stream entering the contact zone is in the range of about 20 to about 40 degrees C. With respect to pressure, it is usually more economical to conduct the reaction at atmospheric pressure or at moderate pressures. Higher pressures than those generally prevailing in the equipment or pipeline carrying the aqueous stream being treated should be avoided because of the increased equipment costs associated with high pressure operations.

The advantages of the invention over the currently used methods of reducing or eliminating cyanide in aqueous streams are that the method of the invention is relatively inexpensive to practice and uses nontoxic reactants. For example, carbon dioxide is less expensive than the sulfur dioxide used in the process of U. S. Pat. No. 4,537,686 and carbon dioxide is nontoxic, whereas, as noted above, sulfur dioxide is quite toxic. In addition to these advantages, the process of the present invention, when carried out until the pH of the aqueous stream being treated is in the range of about 6.5 to about 7.5, usually results in the formation of soluble bicarbonate salts, due to reaction between the carbonic acid by-product and metal cations commonly present in the aqueous streams being treated. Bicarbonate salts are preferred because they do not form scale on the internal walls of the process equipment. On the other hand, the use of sulfur dioxide often results in the formation of scale-forming insoluble salts due to the reaction of by-product sulfuric acid with alkaline earth metal cations present in the aqueous streams being treated. This is particularly the case when the stream being treated contains large quantities of calcium, which reacts with sulfate ion to form water-insoluble gypsum, a compound which has a tendency to form scale on inside equipment surfaces.

The invention is further illustrated by the following examples in which, unless otherwise indicated, parts, percentages and ratios are on a molar basis. In the examples the cyanide concentration was measured by means of an Orion Cyanide Selective Ion Electrode, Research Model 94-06, following the manufacturer's instructions.

EXAMPLE 1

Five hundred twenty-one grams (gms) of aqueous spent gold ore slurry containing about 45 weight % ore and 155 parts per million (ppm) cyanide ion and having a pH of 10 was treated with carbon dioxide and gas streams in the presence of $CuSO_4$. The $CuSO_4$ was added as an aqueous solution in an amount sufficient to provide a $Cu^{++}$ to $CN^-$ mole ratio of 0.8. The treatment with carbon dioxide and oxygen gas streams was carried out in a one liter glass reaction kettle equipped with a magnetic stirrer. Throughout the reaction a nitrogen sweep was maintained in the vapor space to remove HCN gas that was released during the course of the reaction. At the conclusion of the reaction the amount of HCN was determined, and the result is reported in the Table. During the reaction carbon dioxide and oxygen were bubbled through the slurry at flow rates of 0.029 grams per minute (gms/min.) and 0.051 gms/min., respectively. The reaction was continued for 23 minutes with continuous agitation. The pH of the aqueous slurry was measured continuously during the reaction. At the end of the treatment the pH of the aqueous slurry was 7. The final cyanide concentration of the solution was measured and the amount of cyanide destroyed in the reaction was determined. The result is reported in the Table.

EXAMPLE 2 (COMPARATIVE)

The procedure of Example 1 was repeated except that 465 gms. of aqueous spent gold ore slurry having a cyanide concentration of 280 ppm was treated, the carbon dioxide flow rate was 0.026. gms/min and the oxygen flow rate was 0.21 gms/min and no catalyst was used. The reaction was carried out for a period of 18 minutes, after which period the pH of the aqueous slurry had dropped to a value of 7. The final cyanide concentration of the slurry was measured and the amount of cyanide destroyed and the amount of HCN released during the reaction were determined. The results are reported in the Table.

EXAMPLE 3 (COMPARATIVE)

The procedure of Example 1 was repeated except that 636 gms of aqueous spent gold ore slurry containing 290 ppm of cyanide ion was treated, the carbon dioxide flow rate was 0.062gms/min and the oxygen and copper catalyst were omitted. The reaction was permitted to run for a period of 13 minutes, after which period the pH of the slurry had dropped to 7. The final cyanide concentration was measured and the amount of cyanide destroyed and the amount of HCN released during the reaction were determined. The results are reported in the Table.

TABLE

| Ex. | $CN^-$ Conc., ppm Initial | $CN^-$ Conc., ppm Final | $CN^-$ Lost As HCN, ppm | Percent $CN^-$ Reduction Lost as HCN | Percent $CN^-$ Reduction Red. in Slurry |
|---|---|---|---|---|---|
| 1 | 155 | 44 | 1.2 | 0.8 | 70.8 |
| 2 | 280 | 205 | 7.0 | 2.5 | 24.3 |
| 3 | 290 | 210 | 24.0 | 8.3 | 19.3 |

The Table illustrates the benefits provided by the invention. In Ex. 1, which was conducted in accordance with the method of the invention, 70.8% of the cyanide originally contained in the slurry was removed by chemical conversion while only 0.8 % was lost as HCN. In contrast to this, only 24.3 % of the cyanide originally present was removed by chemical conversion and 2.5 % was lost as HCN when the copper catalyst was omitted (Ex. 2), and only 19.3% of the cyanide was removed by chemical conversion while 8.3 % was lost as HCN when the oxygen and the copper catalyst were omitted (Ex. 3).

Although the invention is described with particular reference to specific examples, it is understood that variations of these are contemplated. For example, carbon dioxide and oxygen can be added as a mixture of gases or air can be used as the source of oxygen. Also, as an alternative procedure the invention can be practiced in a series of stages. The scope of the invention is limited only by the breadth of the appended claims.

What is claimed is:

1. A method of reducing the concentration of cyanide in a cyanide-containing aqueous stream comprising contacting the aqueous stream in a reaction zone with an oxygen-containing gas stream and sufficient carbon dioxide to reduce the pH of the aqueous stream to value of at least 8 in the presence of a water-soluble reducible metal catalyst.

2. The method of claim 1 wherein said oxygen-containing gas stream is selected from oxygen and air.

3. The method of claim 1 wherein said metal catalyst is selected from ferric salts, cupric salts and mixtures of these.

4. The method of claim 3 wherein metal catalyst is a cupric salt.

5. The method of claim 4 wherein said cupric salt is cupric sulfate.

6. The method of claim 1 wherein the pH of the aqueous stream being treated is reduced to a value in the range of about 6 to about 8 during the course of the treatment.

7. The method of claim 3 wherein the pH of the aqueous stream being treated is reduced to a value in the range of about 6.5 to about 7.5 during the course of the treatment.

8. The method of claim 6 wherein the molar concentration of oxygen in the reaction zone is in the range of about 0.5 to about 20 moles per mole of cyanide present in said aqueous stream.

9. The method of claim 7 wherein the molar concentration of oxygen in the reaction zone is in the range of about 1 to about 10 moles per mole of cyanide present in said aqueous stream.

10. A method of reducing the concentration of cyanide in a cyanide-containing aqueous stream comprising contacting the aqueous stream in a contacting zone with an oxygen-containing gas stream and carbon dioxide in the presence of a water-soluble metal catalyst, the concentration of said oxygen-containing gas stream in the contacting zone being sufficient to provide an oxygen concentration in the range of about 0.5 to about 20 moles per mole of cyanide present in said aqueous stream, the amount of carbon dioxide added to the aqueous stream being sufficient to reduce the pH of the aqueous stream to a value in the range of about 6 to about 8, and the amount of water-soluble metal catalyst present in the contacting zone is at least about 0.1 mole per mole of cyanide ion present in the aqueous stream.

11. The method of claim 10 wherein said water-soluble metal catalyst is a water-soluble cupric salt.

12. The method of claim 11 wherein said cupric salt is cupric sulfate.

13. The method of claim 11 wherein the treatment is terminated when the pH of the aqueous stream reaches a value in the range of about 6.5 to about 7.5.

14. A method of treating aqueous gold mining tailings effluent to destroy residual cyanide contained in said effluent comprising contacting said effluent in a contact zone with an oxygen-containing gas stream and sufficient carbon dioxide to reduce the pH of the aqueous stream to value of at least 8 in the presence of a water-soluble cupric catalyst.

15. The method of claim 14 wherein the oxygen-containing gas stream is selected from the group consisting of oxygen and air.

16. The method of claim 15 wherein, in the contact zone, the molar ratio of oxygen to cyanide ion is in the range of about 0.5 to about 20:1 and the mole ratio of cupric ion to cyanide ion is at least about 0.1 to 1.0.

17. The method of claim 16 wherein said water-soluble cupric catalyst comprises a cupric salt.

18. The method of claim 17 wherein said cupric salt is cupric sulfate.

19. The method of claim 18 wherein the treatment is carried out until the pH of the effluent leaving the contact zone is in the range of about 6.5 to about 7.5.

20. The method of claim 19 wherein, in the contact zone, the molar ratio of oxygen to cyanide ion is in the range of about 1 to about 10:1.

* * * * *